United States Patent [19]

Wörmann

[11] Patent Number: 5,135,251
[45] Date of Patent: Aug. 4, 1992

[54] ACTIVE OSCILLATION DAMPING SENSOR FOR MEASURING RELATIVE VELOCITY BETWEEN BODY AND AXLE

[75] Inventor: Thomas Wörmann, Wüppertal, Fed. Rep. of Germany

[73] Assignee: August Bilstein GmbH & Co. KG, Ennepetal, Fed. Rep. of Germany

[21] Appl. No.: 624,608

[22] Filed: Dec. 10, 1990

[30] Foreign Application Priority Data

Dec. 11, 1989 [DE] Fed. Rep. of Germany ....... 3940819

[51] Int. Cl.⁵ .......................... G01P 3/52; G01B 7/14; G01H 11/00; B60G 17/08
[52] U.S. Cl. .................... 280/707; 188/299; 267/136; 267/286
[58] Field of Search ............. 280/707, 668; 188/299, 188/1.11, 195, 378-380; 324/163-165, 160, 207.13, 207.2, 207.12, 207.24, 207.22; 73/519, 649, 654, 658; 267/136, 286, 219; 248/550; 364/424.05

[56] References Cited

U.S. PATENT DOCUMENTS

| | | | |
|---|---|---|---|
| 3,524,634 | 8/1970 | Schmidt | 188/299 X |
| 4,502,006 | 2/1985 | Goodwin et al. | 188/299 X |
| 4,577,509 | 3/1986 | Moser | 188/299 X |
| 4,674,768 | 6/1987 | Morra | 280/707 |
| 4,753,328 | 6/1988 | Williams et al. | 188/195 X |
| 4,776,610 | 10/1988 | Moog | 188/299 X |
| 5,009,450 | 4/1991 | Herberg et al. | 280/707 |

Primary Examiner—Douglas C. Butler
Attorney, Agent, or Firm—Max Fogiel

[57] ABSTRACT

Active and adaptable sensor for a dashpot for measuring the difference between the speed of the body of a motor vehicle and that of its axle. A piston rod travels through the sensor and induces a voltage in a winding that is accommodated along with a permanent magnet in a housing. The voltage represents the difference in speed.

11 Claims, 5 Drawing Sheets

ACTIVE OSCILLATION DAMPING SENSOR FOR MEASURING RELATIVE VELOCITY BETWEEN BODY AND AXLE

BACKGROUND OF THE INVENTION

The invention concerns an adaptable sensor for a dashpot for measuring the difference between the speed of the body of a motor vehicle and that of its axle. The dashpot is usually the link that more or less transmits vibrations transmitted from the roadway by the suspension system to the body. Variable hydraulic dashpots are usually employed for this purpose.

To comply with the demands of the automotive industry for increased safety and comfort it is becoming increasing necessary to measure the speed of the body of a vehicle in relation to that of its axle. The results must be precise enough to be utilized to control or set the dashpot. The speed-difference signal can accordingly be considered a profile of the roadway that the vehicle is traveling over.

The as yet unpublished German 3 909 190 discloses a dashpot sensor for a semiactive vehicle body controlled with a speed-difference sensor. Without complex and expensive sensors, the speed difference is measured with a stationary permanent magnet and a sensor coil that travels over it. When a vibration occurs, the magnetic flux induces a voltage in the traveling coil that is proportional to the difference between the speed of the body and that of the axle.

German GM 8 524 086 also discloses a sensor, which comprises a moving permanent magnet and stationary coils.

German OS 2 303 104 discloses an acceleration sensor with a spring that moves a coil through a magnetic field.

German OS 3 538 349 discloses a device equipped with a very wide range of different kinds of sensor.

German OD 3 522 010 discloses a distance sensor with a coil and a core that moves in relation to it.

Finally, German OS 3 536 201 describes an instrument for detecting the relative positions of two moving components with the object of obtaining a reliable signal at both the top and the bottom.

All known sensors or systems are permanently integrated into or onto the dashpot. This is a serious drawback in that sensors cannot be mounted on existing dashpots or resilient wheel-guided legs. Furthermore, the coils or other components often demand electricity. Finally, at the current state of the art, with either the magnet or the coil always stationary, the difference signal is obtained from the relative motion between the coil and the magnet.

SUMMARY OF THE INVENTION

The object of the invention is accordingly to provide a sensor that can be adapted to an active dashpot to measure the difference between the speed of the body of a vehicle and that of its axle, that will be easy to adapt, that includes no moving parts susceptible to wear, that provides precise results, and that is cost-effective to manufacture.

The sensor in accordance with the invention provides in particular the advantages of reliable signal detection and adaptability to existing resilient legs and dashpots.

BRIEF DESCRIPTION OF THE DRAWINGS

Various embodiments of the invention will now be described by way of example with reference to the drawings, wherein.

DESCRIPTION OF THE PREFERRED EMBODIMENTS

A sensor that can be adapted to a dashpot to measure the difference between the speed of the body of a vehicle and that of its axle or wheel suspension is designed to be mounted in the form of an adapter to the untensioned end of a dashpot tube. The outside diameter of the cylinder and the diameter of the piston rod that enters it must be taken into consideration. These structures allow the sensor to be mounted on either an existing commercially available dashpot or a McPherson leg. It is precisely in conjunction with such legs that it has always previously been impossible to relatively simply and reliably measure the speed of the mass of the wheel in relation to that of the body. The adapted sensor is connected by cable to a computer-inside the vehicle. The computer calculates from the signal deriving from the sensor how much force is necessary to adjust the valves inside the dashpot.

Since the dead length of the particular tube employed is not as decisive in conjunction with resilient legs as it is in a conventional dashpot, it would also be possible to manufacture the tube to the correct length for the type of sensor that might be installed at a later date.

Since the sensor is always adapted to a dashpot tube or cylinder, the sensor will never be exposed to motion.

Figure 1:
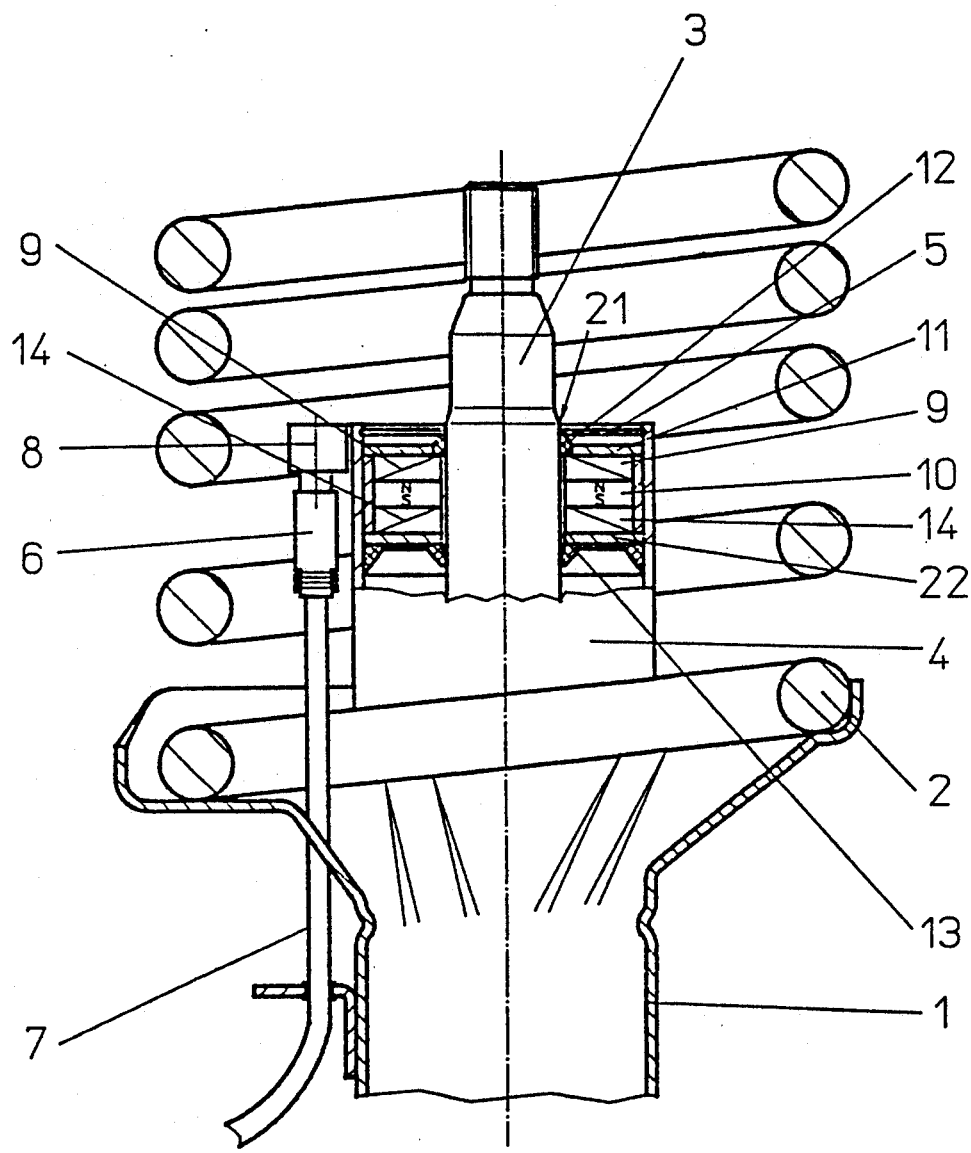
FIG. 1 illustrates a wheel-guided resilient leg with a speed-difference sensor adapted to it.

The sensor housing 11 in the embodiment illustrated in FIG. 1 contains the following components in the following sequence: a winding 9, a permanent magnet 10, and another winding 14. The two windings are in series, with the end of first winding 9 connected to the beginning of second winding 14. The beginning of first winding 9 and the end of second winding 14 are connected by way of a plug 6 and jack 8 and then by way of a cable 7 to a computer inside the vehicle. Magnet 10 is magnetized axially and is interposed between windings 9 and 14, with its flux accordingly directed into the windings. The windings and the magnet are concentric with a bore, which has the same diameter as a piston rod 3 that travels back and forth through it. There is a narrow air gap 13 between piston rod 3 and magnet 10 with its two windings. Piston rod 3 must not be made out of an antimagnetic material.

When piston rod 3 moves in response to irregularities in the roadway, it interferes with the flux of magnet 10, inducing a voltage in windings 9 and 14. This voltage is a measure of the difference between the speed of the body and that of the wheels. The more rapidly the rod moves, the more voltage is induced. The induced voltage is accordingly proportional to the speed difference.

It is important for the piston rod 3 to travel through a scraper 12 as it leaves housing 11 to prevent any contaminants that adhere to its surface from entering the housing.

Figure 2:
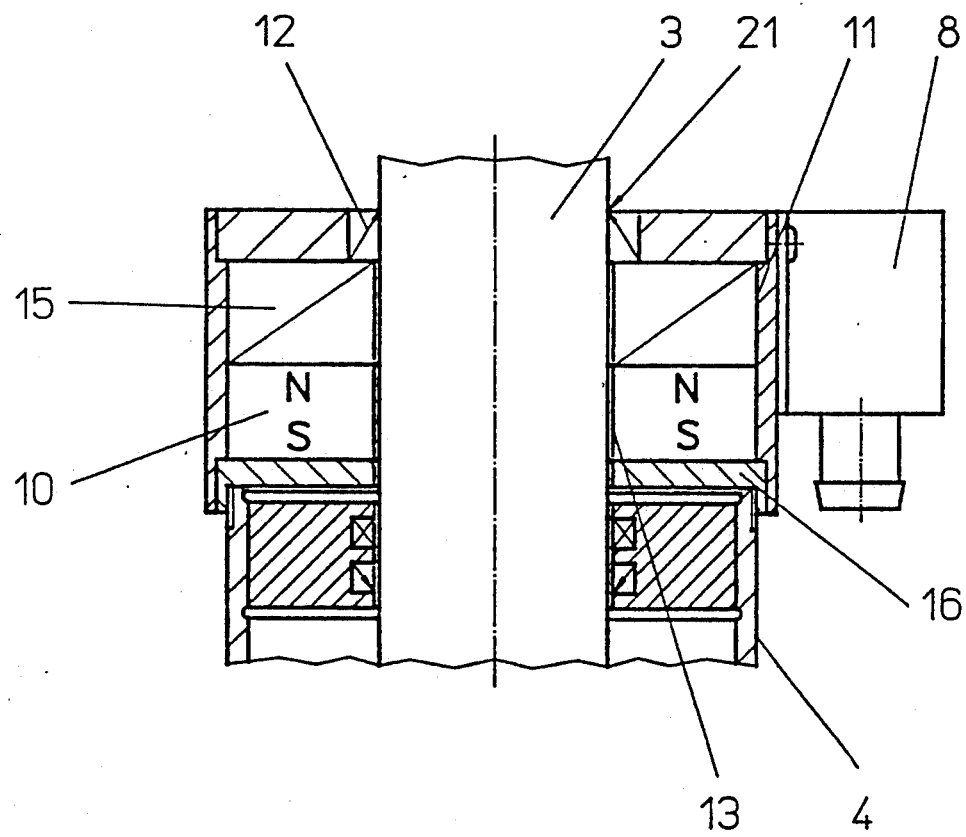
FIG. 2 illustrates an embodiment with a coil and a permanent magnet.

The housing of the embodiment illustrated in FIG. 2 accommodates a self-supporting winding 15 and a magnet 10. This system, which is employed with a conventional dashpot cylinder, also precisely measures the difference between the speed of the wheels and that of the body. A voltage induced in winding 15 by piston rod 3 is transmitted to an unillustrated vehicle computer by way of a jack 8. To eliminate magnetic shunt, however, both housing 11 and the cap 16 that closes it off must be made from an antimagnetic material. Cylinder 4, which is ordinarily made from iron, will not interfere with the magnetic flux because antimagnetic cap 16 constitutes an artificial air gap. It is important both to the embodiments already described and to those to be described hereinafter for housing 11 to be made from an antimagnetic material.

Figure 3:
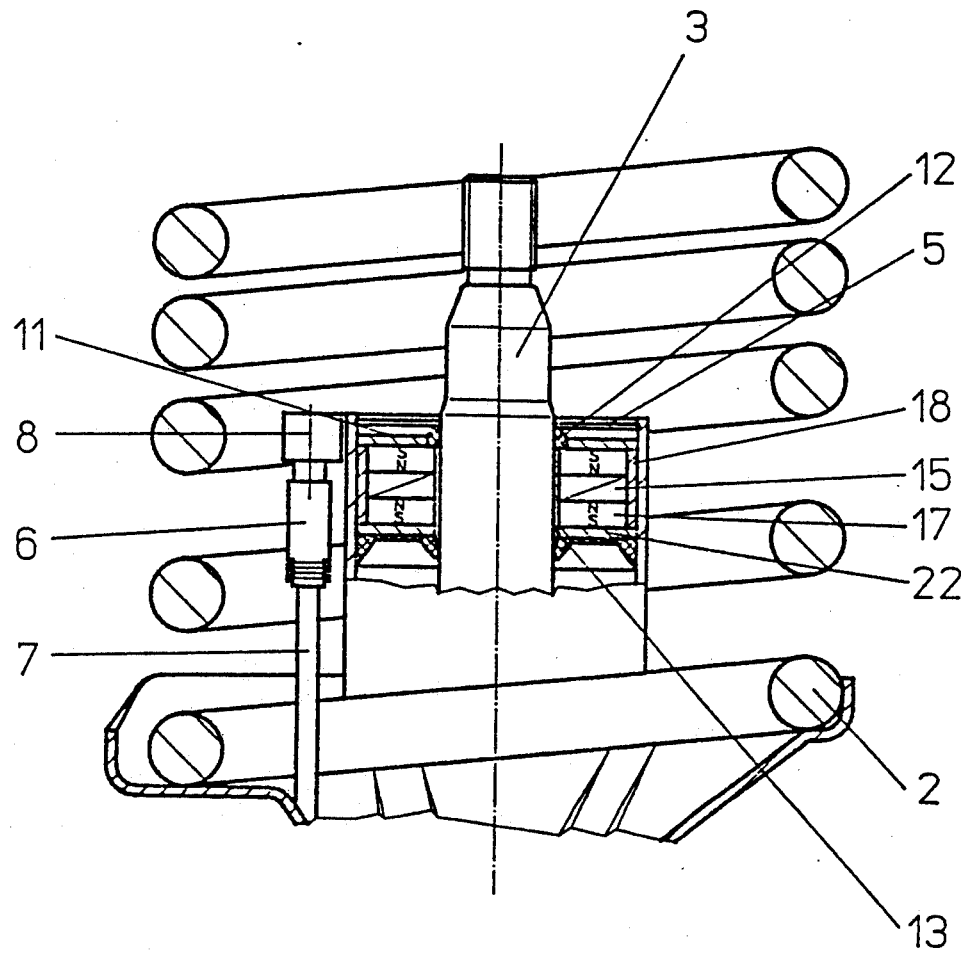
FIG. 3 illustrates a wheel-guided resilient leg with a speed-difference sensor consisting of two magnets and a winding adapted to it.

The components of the sensor embodiment illustrated in FIG. 3 are somewhat different. Again, there is only one winding 15. Above and below it are permanent disk magnets, which are again magnetized axially. The magnets are installed with identical poles facing the coil, so that they repel each other. The voltage induced in winding 15 is again transmitted to an unillustrated computer by way of a jack 8 and cable 7. The cap on the cylinder constitutes a layer 20 insulation, which is equivalent to an air gap.

Figure 4:
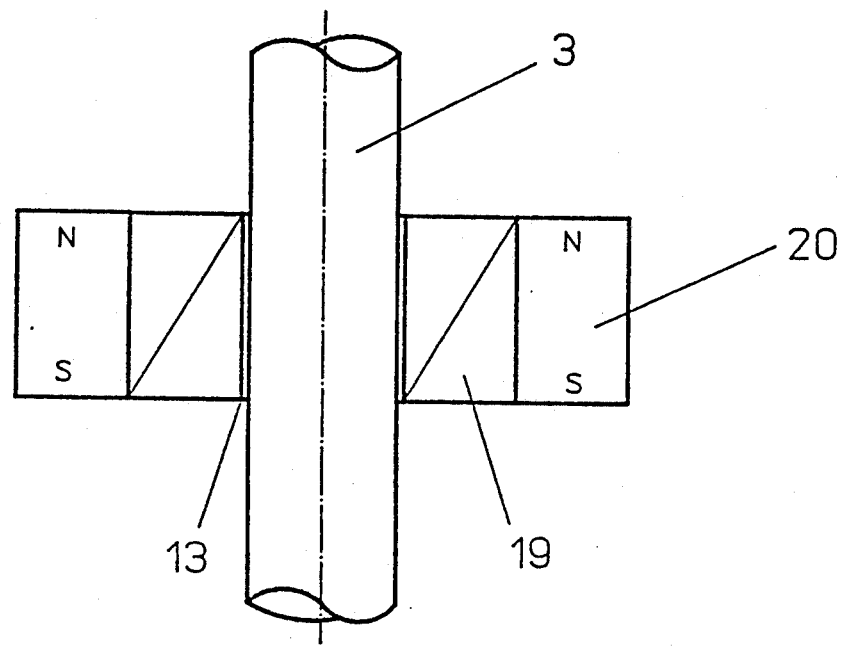
FIG. 4 is a schematic representation of a winding and a permanent magnet.

FIG. 4 schematically illustrates another embodiment of the invention with a winding 19 coiled concentrically around a piston rod 3, leaving a natural air gap 13 between them. Around concentric winding 19 is an annular magnet 20 that is also magnetized axially.

Figure 5:
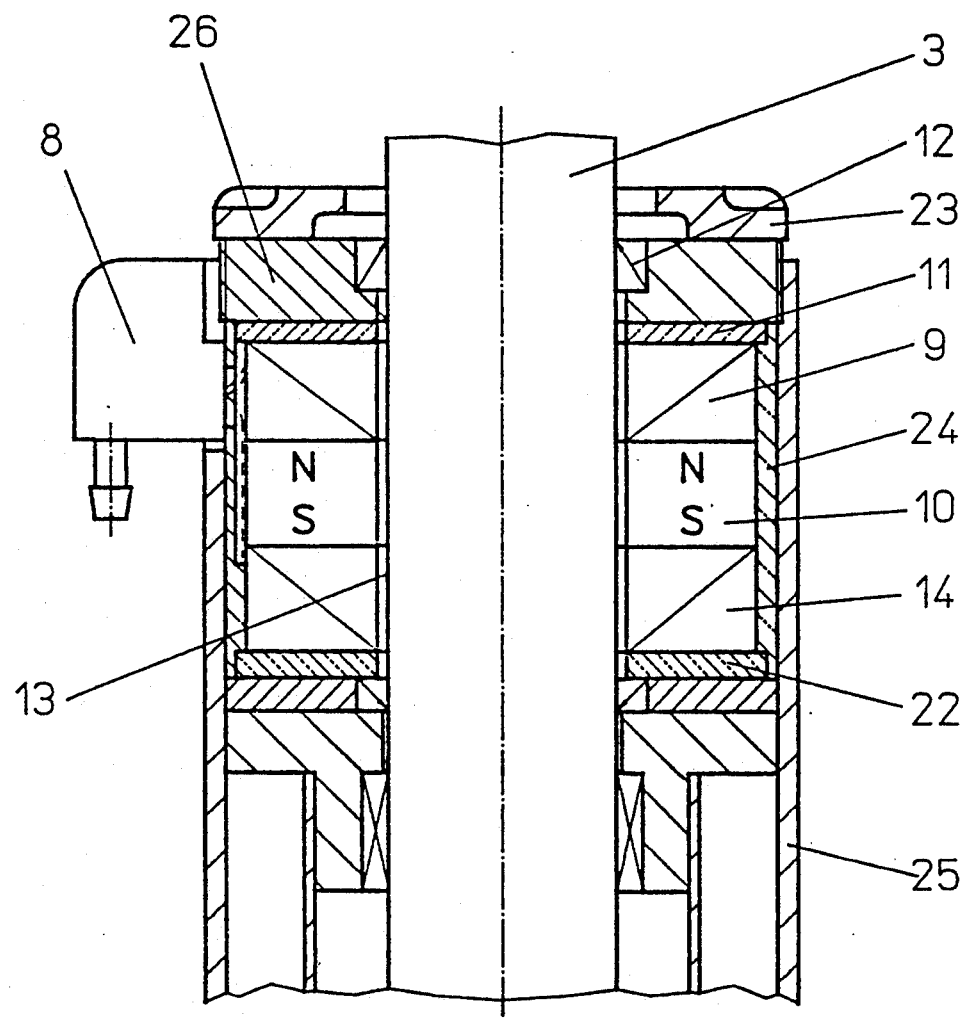
FIG. 5 illustrates a sensor adapted to a specially prepared dashpot tube.

The embodiment illustrated in FIG. 5 has a dashpot pipe 25 that has been specially designed to accept a sensor. The adaptable sensor is accommodated in a housing 24 of antimagnetic material. A permanent magnet 10 is positioned concentric to piston rod 3 between two windings 9 and 14. A cap at the bottom of the sensor constitutes a layer 22 of insulation. Dashpot pipe 25 is sealed off by a cap 26 containing a seal 12 that rests against piston rod 3. The assembly as a whole is sealed off by a threaded cap 23.

It will be evident from this embodiment that either a specially designed sensor can be employed with an existing dashpot pipe or a specially designed dashpot pipe with an existing sensor.

As will be evident from the foregoing examples, the invention enables the construction of a speed-difference sensor from simple and inexpensive components. This sensor provides a very precise voltage signal proportional to the speed difference. None of the windings in the illustrated embodiments is provided with voltage, meaning that there is no input voltage, and the object of the invention is an active component that generates a voltage representing the speed difference.

To allow as wide a range of applications for the speed-difference sensor as possible, the cable can be connected either permanently or by means of a plug and jack. It is important for unexceptionable function for the magnets to be magnetized axially.

I claim:

1. A dashpot active sensor in a motor vehicle having a body and an axle for sensing and measuring a difference in speed between said body and said axle, comprising: dashpot means having an end secured to said body; a wheel suspension in said motor vehicle; an attenuating cylinder on said wheel suspension; a piston rod movable in and out of said cylinder; a housing; a permanent magnet with a magnetic field in said housing and at least one winding adjacent said magnet, movement of said piston rod adjacent said magnet inducing in said winding a measurable control voltage signal representing said difference in speed between said body and said axle for transmission to a processing circuit, said sensor with said housing being stationary, said housing having a central bore, said piston rod being movable through said central bore and being closely and tightly surrounded by said central bore, said sensor with said housing being mountable on an upper side of a dashpot, said winding being free of excitation input voltage when said control voltage signal is induced in said winding, said magnet and winding forming a combination with inductance varied by movement of said piston rod to induce in said winding said measurable control voltage signal, said winding being stationary relative to said magnetic field when said voltage signal is induced in said winding.

2. A dashpot active sensor as defined in claim 1, wherein said at least one winding comprises two windings connected electrically in series, one of said windings being positioned above said permanent magnet and the other one of said windings being positioned below said permanent magnet.

3. A dashpot active sensor as defined in claim 1, wherein said permanent magnet is positioned above said winding; and an additional permanent magnet located below said winding.

4. A dashpot active sensor as defined in claim 1, wherein said permanent magnet surrounds said winding.

5. A dashpot active sensor as defined in claim 1, wherein said magnet is axially magnetized.

6. A dashpot active sensor as defined in claim 1, wherein said housing is comprised of antimagnetic material.

7. A dashpot active sensor as defined in claim 1, including a scraping seal within said central bore for scraping against said piston rod.

8. A dashpot active sensor as defined in claim 1, including a connector on said housing for providing connections to said processing circuit.

9. A dashpot active sensor as defined in claim 1, including a cable permanently secured to said housing and connected to said processing circuit.

10. A dashpot active sensor as defined in claim 1, including helical spring means cooperating with said dashpot means for forming wheel-guided resilient legs.

11. A dashpot active sensor in a motor vehicle having a body and an axle for sensing and measuring a difference in speed between said body and said axle, comprising: dashpot means having an end secured to said body; a wheel suspension in said motor vehicle; an attenuating cylinder on said wheel suspension; a piston rod movable in and out of said cylinder; a housing; a permanent magnet with a magnetic field in said housing and at least one winding adjacent said magnet, movement of said piston rod adjacent said magnet inducing in said winding a measurable control voltage signal representing said difference in speed between said body and said axle for transmission to a processing circuit, said sensor with said housing being stationary, said housing having a central bore, said piston rod being movable through said central bore and being closely and tightly surrounded by said central bore, said sensor with said housing being mountable on an upper side of a dashpot, said winding being free of excitation input voltage when said control voltage signal is induced in said winding, said magnet and winding forming a combination with inductance varied by movement of said piston rod to induce in said winding said measurable control voltage signal, said winding being stationary relative to said magnetic field when said voltage signal is induced in said winding; said at least one winding comprising two windings connected electrically in series, one of said windings being positioned above said permanent magnet and the other one of said windings being positioned below said permanent magnet; said permanent magnet being axially magnetized; said housing being comprised of anti-magnetic material; a scraping seal within said central bore for scraping against said piston rod; a connector on said housing for connecting to said processing circuit; and helical means cooperating with said dashpot means for forming wheel-guided resilient legs.

* * * * *